United States Patent
Urizar

(10) Patent No.: US 8,038,012 B2
(45) Date of Patent: Oct. 18, 2011

(54) PROCEDURE AND APPARATUS OF THE CONCENTRATION OF HYDROPHOBIC MATERIALS

(76) Inventor: Daniel Urizar, Santiago (CL)

( * ) Notice: Subject to any disclaimer, the term of this patent is extended or adjusted under 35 U.S.C. 154(b) by 1097 days.

(21) Appl. No.: 11/764,915

(22) Filed: Jun. 19, 2007

(65) Prior Publication Data

US 2007/0295668 A1    Dec. 27, 2007

(51) Int. Cl.
*B03D 1/02* (2006.01)
*B03D 1/14* (2006.01)
(52) U.S. Cl. .................. 209/164; 209/168; 209/170
(58) Field of Classification Search ............ 209/164, 209/168, 170
See application file for complete search history.

(56) References Cited

U.S. PATENT DOCUMENTS

| | | | | |
|---|---|---|---|---|
| 4,407,715 A | * | 10/1983 | Sheludko et al. | 209/164 |
| 4,752,383 A | * | 6/1988 | McKay et al. | 209/164 |
| 5,096,572 A | * | 3/1992 | Hwang | 209/164 |
| 5,249,688 A | * | 10/1993 | Hwang | 209/170 |
| 5,266,240 A | * | 11/1993 | Valenzuela et al. | 261/93 |
| 5,554,280 A | * | 9/1996 | Loehr | 210/167.26 |
| 6,776,292 B1 | * | 8/2004 | Nenno et al. | 209/168 |

* cited by examiner

*Primary Examiner* — Thomas M Lithgow
(74) *Attorney, Agent, or Firm* — Fulbright & Jaworsk, L.L.P.

(57) ABSTRACT

A procedure and apparatus for the concentration of hydrophilic materials through flotation which consists of two devices operating in series. The first device performs the function of feeding the gas and the pulp, generate bubbles and produce contact with the hydrophobic particles to be concentrated. The second device performs the functions of separating and evacuating the froth carrying the hydrophobic materials and the evacuation of the aqueous pulp with the materials with water affinity. The gas-pulp mixing device contains inside it solid mixing means, preferably bead shaped and of a density lower than that of the pulp to be processed. The generation of bubbles and their contact with hydrophobic materials happen when the gas and the pulp transit through the interstices between the mixing media which have discrete freedom to move in the interior. The separation of the froth takes place in a tank without motorized agitation systems volume of which can permit the pulp's residence times within a range of 20 to 60 seconds. This tank has in its upper section overflow ridges and froth collecting troughs. The discharge of the tailings is effected through one or more outgoing pipes placed in the inferior section of the slanted bottom and flow of which is controlled by valves. The selectivity of the concentration is controlled by changing the depth at which the bubbler discharges into the froth separator tank.

12 Claims, 3 Drawing Sheets

PROCEDURE AND APPARATUS OF THE CONCENTRATION OF HYDROPHOBIC MATERIALS

CROSS-REFERENCE TO RELATED APPLICATIONS

The present invention claims priority to Chilean Patent Application Serial No 1547/2006, filed on Jun. 19, 2006 which is incorporated by reference herein in its entirety.

BACKGROUND OF THE INVENTION

Flotation is a physical-chemical process for the separation of materials which uses the water repellent or water affinity surface characteristics of the materials to be separated. It is the most commonly used method for the concentration of basic sulfides of metals such as copper, molybdenum, lead, zinc. etc. that have a natural hydrophobicity, which increased with the application of flotation reagents. It consists basically in placing the materials to be separated previously ground and treated with flotation reagents in an aqueous medium to form a pulp into which a gas has been introduced to generate bubbles. Hydrophobic materials adhere to the surface of the bubbles and hydrophilic materials remain within the pulp. The froth carrying the hydrophobic materials rises to the surface and overflows into the froth collecting troughs wherefrom it is removed from the flotation apparatus.

There is currently a large variety of flotation apparatus in various shapes, sizes and methods for the injection of gas into the pulp. Whatever their design however, they must perform the following basic functions:
  introduce to the machine the gas and aqueous pulp containing the materials to be separated;
  maintain the pulp and materials to be separated in suspension by avoiding sedimentation and the accumulation of solids in the apparatus;
  generate gas bubbles and provoke their contact with the hydrophobic materials to be concentrated;
  provide a system for the withdrawal of the froth loaded with the hydrophobic substances constituting the concentrate; and
  maintain the materials with water affinity inside the pulp which constitutes the tailings and provide for a discharge system.

The machines performing these functions can be classified in two main group depending on how they perform these functions:
  machines with motorized mechanic agitation, and
  pneumatic machines without mechanical agitation.

Machines with motorized mechanical agitation are characterized in that they create contact of the bubbles with the solid hydrophobic and maintain the pulp in suspension by means of a rotor-stator assembly. The pulp is fed through the lower part of a tank in whose central axle the rotor-stator is installed. The rotor is activated by a motorized system installed at the upper end of its axle and is also used to introduce the gas. The tank has in its upper section ridges for froth overflows which are discharged by froth collecting troughs. The extraction of the tailings goes through the lower part opposite the feeding end with valves which control the flow and level of the pulp within the tank. Depending on whether the air is introduced to the flotation machine with an external system or is introduced by the rotor itself these machines are classified as forced aeration or auto aspiration machines. A number of flotation machines are used in mineral concentration operating in series and with residence times varying between 20 and 40 minutes.

Mechanical agitation machines are the leaders in the world mining industry markets and differ mainly only in the design of the rotor-stator system. Pneumatic flotation machines do not have a motorized mechanical agitation system and flotation columns are the ones in most widespread use in the mining industry. The columns have two clearly defined areas: one for collection and one for a cleaning area. The feeding of the pulp is effected under the interface of these two areas. The bubbles are generated by injecting gas through gas nozzles placed at the bottom of the column. As the hydrophobic particles descend they become exposed in the collection area to ascending bubbles, which they join and are then transported for cleaning to the upper area of the column where a thick layer of froth is formed to which wash water is added to obtain clean concentrates. The hydrophilic particles do not adhere to the bubbles and continue descending with the aqueous pulp and are finally discharged from the bottom through a flow control valve. Flotation columns have in common their tallness, normally more than 10 meters. For this reason the air injected at the bottom under the pressure of 30 psi. needed to overcome the pressure in the pulp column and the load loss in the bubbler. Additionally, because of their great height they also normally require pumps to supply the pulp. The differences between the columns is found in the design of the bubblers which inject the gas. Depending on the location of the gas bubblers they can be classified as internal bubbler columns and external bubbler generators. In columns with internal nozzles the bubble generator is in the lower part of the column and in direct contact with the pulp. The nozzles can be metallic, of porous ceramic, filter fabrics and perforated rubber. The drawback in these types of bubble generators is that the openings wherefrom the gas is issued gets clogged with pulp particles and/or encrustations due to the hardness of the water used in the mining industry. Replacing them requires withdrawing them from the column, something which causes a drop in the availability of these equipments. In columns with external bubble generators these are located outside the column. Part of the pulp tailing is recycled with pumps, combining static gas-pulp mixers discharge of which is injected into the lower portion of the column. The static generators generate a high load loss and accelerated wear. Another type of external bubble generator instead of recycling the tailings pulp injects water which is mixed with the gas in a static mixer. An example of this type of bubble generator is the one developed in the U.S. Pat. No. 4,752,383, where the static generator is a container holding small glass beads so packed as to impede their displacement. Water and air are mixed in their transit through the packed layer of glass beads, and the gas-water mixture is discharged at the other end of the apparatus and injected through the lower area of the column The layer of glass beads packed in this type of bubblers becomes encrusted with increasing rapidity by the hardness of the water used by the mining industry and ends up clogging the bubbler. The required pressure for water and air injection to this type of bubblers is normally above 50 psi, which must be increased as the bubbler becomes clogged by encrustations, a reason for which they are no longer used.

BRIEF SUMMARY OF THE INVENTION

This invention refers to a procedure and apparatus for the concentration of hydrophobic materials by means of flotation consisting of two devices operating in series. The first device provides the gas and pulp feeding functions, the generation of bubbles and produces contact with the hydrophobic particles to be concentrated and which have adhered to their surface. The second device separates and evacuates the froth with the hydrophobic materials and evacuates the aqueous pulp carrying the materials with water affinity. The pulp and gas enter the first device at pressures slightly higher than atmospheric, preferably at 5 psi and in flows controlled by feeding valves. This device is a gas-pulp mixer holding in its interior a plurality of solid mixture means, preferably of spherical shape and density lower than the density of the pulp to be processed and with discrete freedom to move in all directions. The mixing device has in its lower section one or more exit slots for the aerated pulp, with openings large enough to allow the discharge of the gas-pulp mixture without creating significant pressure increases in its interior but of a width lesser than the size of the mixing media in order to impede their outflow. This device also has inside grids placed under the intake opening of the pulp and gas and where the separation of the grid elements is also less than the size of the mixing media. Immediately under this mixing media retaining grid there is an opening with a lid which, when opened, allows the reloading of mixing media into the device. The bottom of the bubbler is preferably inclined to permit the outflow of large particles which could accumulate inside. The bubbler can be cylindrical in shape with a bottom in the shape of a cone or of a parallelepiped with a pyramidal or inclined bottom with one or more entrances for the air-pulp. The second device in this invention, operating in series with the first device performs the separation and unloading of the froth containing the hydrophobic materials and the unloading of the tailings containing materials with water affinity. This device consists of a cylindrically shaped cell or tank with a conic or parallelepiped shaped bottom or with one or two inclinations. The tank has on its upper edge froth retaining edges and immediately attached to them receiving troughs for the froth which is thus evacuated from the cell for its handling by external means. It has in its inferior section one or more openings to unload the pulp with the hydrophilic materials. The discharge flow is controlled by one or more valves which also allow control of the pulp level in the cell. Increases in the discharge flow produce, drops in the pulp level and vice versa. This (these) valve (valves) can be manually or automatically operated.

The feeding from the bubbler to the froth separating element can be effected over the froth, near the pulp-froth interface or inside the pulp phase. As the feeding point is deepened so does the selectivity of the concentration and there is, normally, a decrease in the recovery of hydrophobic particles. When varying the depth of the discharge point of the bubbler the feeding pressure of the gas and water to the bubbler must be adjusted to avoid the formation of gushes which can break the froth layer. Increases in selectivity are also obtained by adding froth washing water which will permit replacing the water contained in the feed pulp which is dragged hydraulically with clean water through the spaces between the bubbles.

The flotation cell of this invention differs from cells with mechanical agitation and from column cells in that the generation of gas bubbles and their contact with the particles to be concentrated take place in the gas-pulp mixing device and not in the tank, and this results in a significant savings of flotation time and thereby the volume of the tank.

The froth separator tank in this invention differs from the tanks in column cells in its lesser volume since it requires residence time of less than one minute instead of residence times of about 10 minutes as required by column cells. The dimensions of the cross section of the tank are similar to those of the cell tanks so that the lesser volume required by the tank is reflected in a height ten times lesser than the height of the columns.

The foregoing has broadly outlined certain objectives, features, and technical advantages of the present invention in order that the detailed description of the invention that follows may be better understood. Additional features and advantages of the invention are described hereinafter, and form the subject of certain claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages are better understood from the following description when considered in connection with the accompanying figures. It is to be expressly understood, however, that such description and figures are provided for the purpose of illustration and description only and are not intended as a definition of the limits of the present invention.

BRIEF DESCRIPTION OF THE DRAWINGS

For a better understanding of the described process, which is the primary purpose of this invention application, an example is given which becomes a second objective of this application and not limited to said apparatus nor to the obvious variations it can undergo.

DETAILED DESCRIPTION OF THE INVENTION

Figure 1:
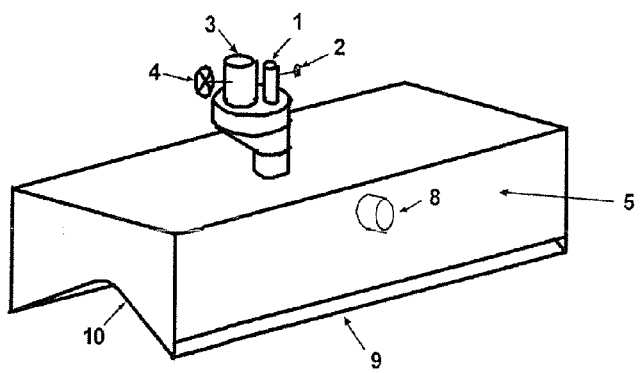
FIG. 1 is a outside perspective view of the bubbler of parallelepiped shape.
Figure 2:
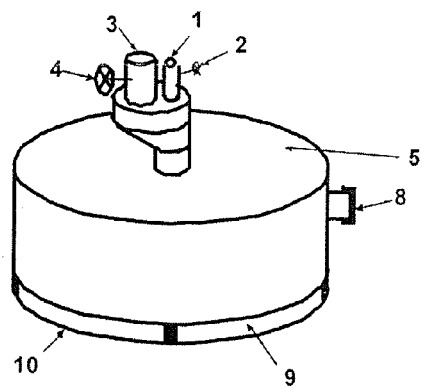
FIG. 2 is a outside view of bubbler of cylindrical shape and conical bottom.
Figure 3:
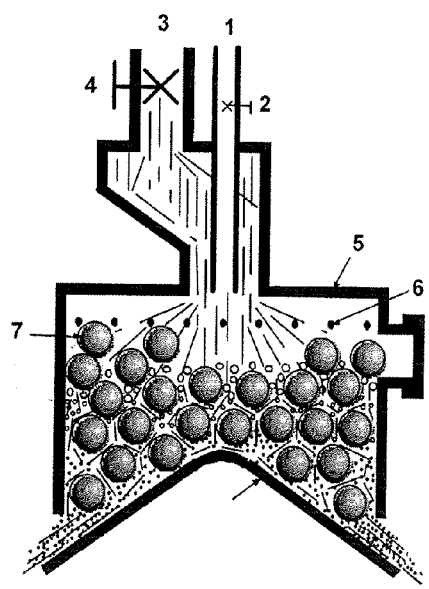
FIG. 3 is a crosscut of bubbler showing details of internal parts.

The gas is fed to the bubbler through pipe (1) flow of which is controlled by a valve (2) The pulp enters through pipe (3) flow of which is controlled by valve (4) Pulp and gas enter concentrically to the body of the bubbler (5) through its upper section. The inside of the bubbler contains mixer media (7) consisting, preferably, of beads made with a material with a density lower than that of the pulp being delivered. These mixing media are held inside the bubbler by an upper retaining grid (6) and lower discharge slots (9).

The bottom of the bubbler (10) is inclined towards the unloading slots to avoid the accumulation of thick particles inside it. The pulp and gas fed to the bubbler are mixed when descending through the spaces between the mixing beads which have discrete freedom to move in all directions, avoiding the clogging of the bubbler and producing, in addition, a self cleaning effect for the mixing beads. The filling volume for the mixing beads inside the bubbler must be such that it will permit their displacement in at least three times the size of the thickest fed particle in such a way that, for instance, if the flotation cell will be used for primary flotation where, because of classification problems in the mixing circuit, can hold particles of up to 6 mm., the size of the mixing beads have a diameter of about 50 mm. On the other hand, if the machine is to be used in a cleaning flotation circuit, where the size of the solids is normally much less, the beads to be used will be of about 5 mm. During the bubbler operation the mixing beads are fluidized and are in continuous movement due to the carrying force of the fed gas and pulp, which tends to drag them to the bottom while, on the other hand, the beads tend to be displaced upwards because of their lesser density. The transit of the pulp and gas from their feeding point, located in the central upper section, towards the lower edges, where the discharge slots are found, produces lateral movements in the beads due to the pulp's transit through the spaces of the mixing media. The relative movement of the mixer beads with the pulp, which generally contains abrasive solid materials, generates wear in these mixing elements, continually reducing their size and finally being discharged through the discharge slots when their size is reduced to a lower dimension. In order to maintain the adequate level of mixing media inside the bubbler it must be reloaded through the opening with a removable lid (8).

When the gas-pulp mixture enters the froth separator container (11) the speed drops abruptly to values between 0.3 and 1.5 cm./second. making it, in this way, possible to achieve the quick separation of the froth which is displaced towards the surface and laterally towards the overflow edges (12) and is withdrawn from the system through the froth collecting ducts (13) The pulp containing the hydrophilic materials not adhering to the bubbles leaves the container through the discharge pipe(14) flow of which is controlled by valve (15).

The selectivity of the concentration depends on the position of the bubbler with respect to the froth separator container. The deeper the discharge from the bubbler, the greater the selectivity the cleaner concentrates obtained due to the fact that the bubbles loaded with solid hydrophobics must rise to the surface, producing the separation of weakly adhered particles which normally correspond to non liberated particles consisting of mixed particles of hydrophobic and hydrophilic material. When the mixed particles are separated there is a decrease in the recovery of hydrophobic materials associated to these mixed particles which emerge jointly with the hydrophilic materials through the lower discharge duct instead of being discharged by the container's upper overflow ridges increasing the concentrate's metal content and decreasing recovery. It is also possible to achieve increases in the selectivity of the concentration by adding wash water to the froth through nozzles (17) placed at regular intervals in one or more of the wash water pipes (16).

Figure 4:
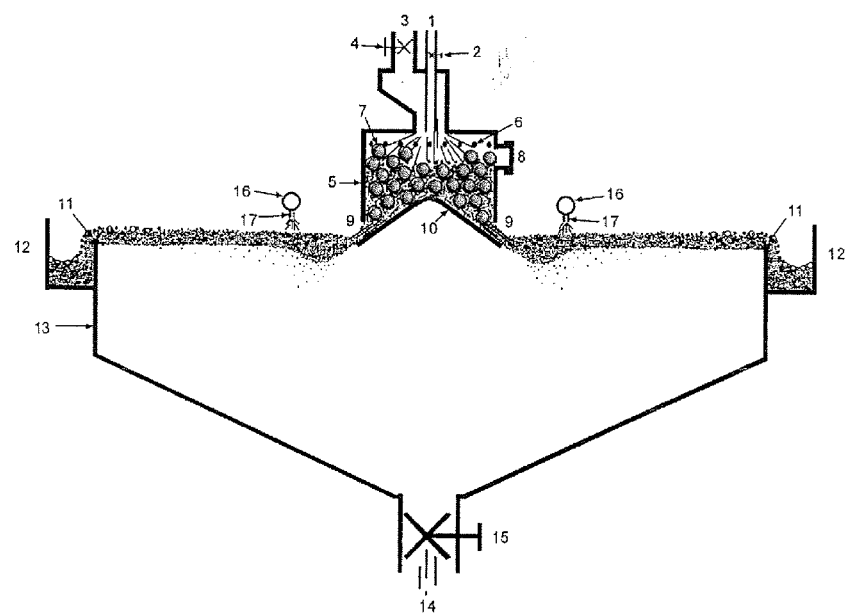
FIG. 4 is a schematic representation in crosscut of the apparatus for the procedure of the invention, showing the bubbler unloading over the froth in the froth separation cell.
Figure 5:
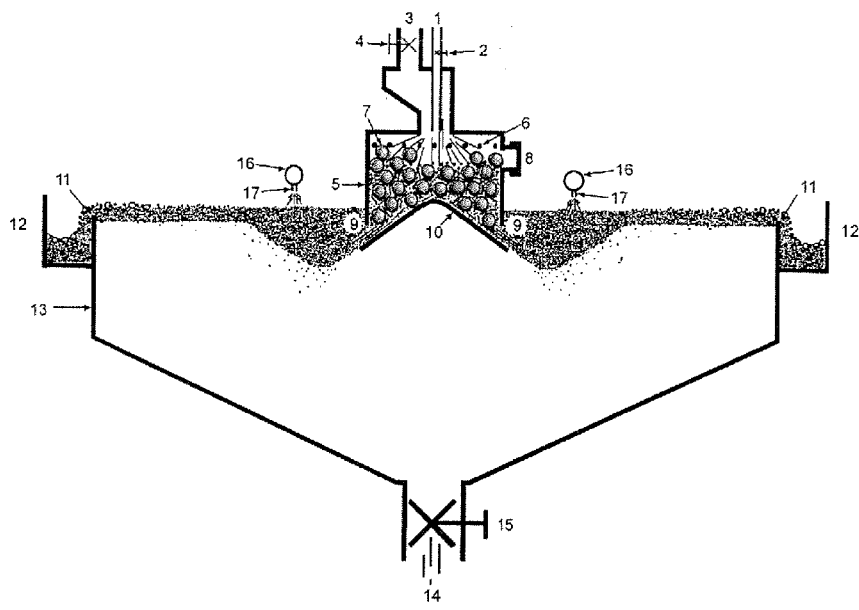
FIG. 5 is a schematic representation in crosscut similar to the one in FIG. 4 with the bubbler unloading into the froth separator cell close to the pulp-froth interface.
Figure 6:
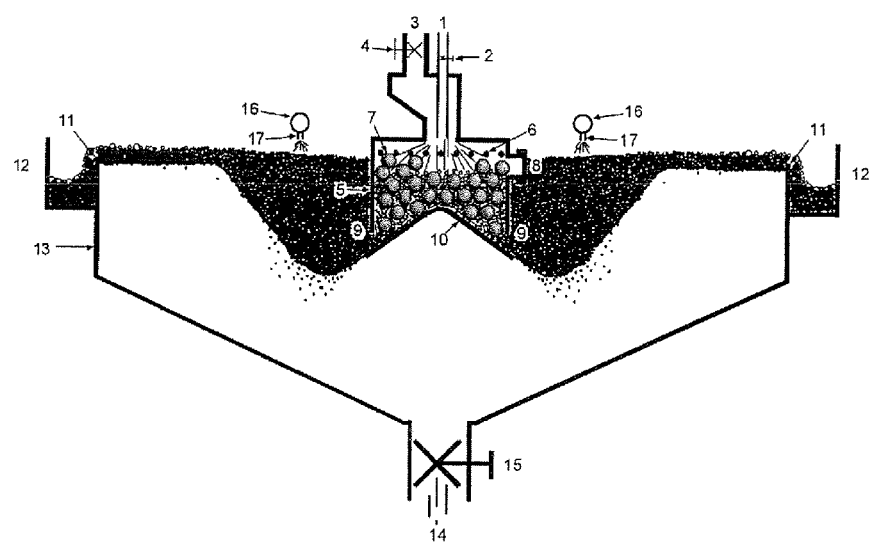
FIG. 6 is a schematic view of the apparatus of the invention similar to FIGS. 4 and 5 with the bubbler unloading in the inside the pulp, underneath the pulp-froth interface.

The apparatus of the invention can also be used to separate hydrophobic from hydrophilic materials, whether solid or liquid. One instance of the application of this invention is in the concentration of metal sulfides through flotation at all stages of the flotation circuit. In the apparatus for the primary flotation stage, where maximum recovery is sought, the discharge of the bubbler is placed preferably on the froth as shown in FIG. 4. If the apparatus is used in cleaning flotation circuits where priority is given to the selectivity of the concentration, the bubbler is placed preferentially under the pulp-froth interface, as is shown in FIG. 6. For intermediate stages of the circuit, the bubble discharge is placed at an intermediate depth, as shown in FIG. 5.

Another use for this invention is the separation of hydrophobic oils or organic liquids from water as, for example, in the cleansing of water which has been contaminated by oil spills. The procedure and apparatus of this invention maximizes the generation of bubbles and their contact with the hydrophobic materials found in aqueous pulp outside the flotation tank of the flotation machine, drastically reducing flotation time, eliminating the need for motorized operations of mechanized agitation and with flotation times in columns with differences about ten times less than in the flotation machines currently being used. These differences achieve a significant reduction in the operating costs because of the lesser consumption of energy and, in addition, reduce the investment because of the smaller size of the equipment resulting from less time of residence of the pulp in the machine. Another feature in the procedure in the invention is that both gas and pulp are fed at a pressure slightly higher than atmospheric and the difference between the flotation columns, Also, the mixing media are not packed in a container and are in discrete freedom to move in all directions and consequently do not clog.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A procedure for the concentration by flotation of hydrophobic materials from a pulp of hydrophobic and hydrophilic materials contained in an aqueous medium by the addition of a gas, wherein the concentration is achieved in two devices, a first and a second device, operating in series, the gas and pulp are supplied continuously to the first device consisting of a gas-pulp mixer containing solid mixing objects with a density lower than that of the pulp and with discrete freedom to move inside said gas-pulp mixer as the pulp and gas pass through interstices generating a plurality of bubbles which come in contact with the hydrophobic materials which adhere to the surface of the bubbles thereby forming a pulp-bubble mixture; the pulp-bubble mixture leaves the gas-pulp mixer by an inclined bottom end of the gas-pulp mixer, through discharge slots having a width lesser than the diameter of the solid mixing objects which prevents the mixing objects outflow; the discharged pulp-bubble mixture, from the gas-pulp mixer is fed to the second device, forming a froth phase in the second device, which consists of a froth separating tank, with a surface area permitting the obtention of a descending speed in a range between 0.3 and 1.5 centimeters per second and a volume permitting a residence time for the pulp in a range of 20 to 60 seconds, having at the froth separating tank's upper end overflow edges and froth collecting troughs, with an inclined bottom of greater than 20 degrees inclination, and, at a lower end thereof, having discharge orifices with valves for controlling flow rates of tailings.

2. A procedure for concentration, according to claim 1, wherein selectivity of the concentration process is controlled by changing the discharge level of the gas-pulp mixer by which the discharged pulp-bubble mixture is fed to the froth separating tank.

3. A procedure for the concentration, according to claim 1, wherein the variation in the discharge level of the gas-pulp mixer to the froth separating tank is obtained by a vertical displacement in the gas-pulp mixer.

4. An apparatus for the concentration by flotation of hydrophobic materials from a pulp of hydrophobic and hydrophilic materials contained in an aqueous medium by the addition of a gas which permits the use of the procedure defined in claim 1, wherein the gas and pulp are supplied through valves in a continuous and controlled way and through tubes to a gas-pulp mixer containing solid mixing objects with a density lower than that of the pulp being processed and with discrete freedom to move as the pulp and gas pass through interstices, with the gas and the pulp to form multiple bubbles which come into contact with the hydrophobic materials which adhere to the surface of the bubbles thereby forming a pulp-bubbles mixture; the pulp-bubble mixture is discharged through peripheral slots in the bottom of the gas-pulp mixer which feeds a froth separating tank, forming a froth phase in the froth separating tank, with a surface area permitting a descending speed of the pulp in a range of 0.3 to 1.5 centimeters per second and a pulp residence time of 20 to 60 seconds, which separates the froth phase which overflows edges at an upper end of the froth separating tank towards froth collecting troughs, this froth separating tank also having a bottom section with an inclination of greater than 20 degrees having at a lower section discharge orifices and flow control valves whereby the pulp and the hydrophilic materials are evacuated.

5. An apparatus for concentration, in accordance with claim 4, wherein the gas-pulp mixer is displaced vertically to vary its discharge level into the froth separating tank.

6. An apparatus for concentration, in accordance with claim 4, wherein the discharge level of the gas-pulp mixer into the froth separating tank is arranged over the surface of froth in the froth separating tank.

7. An apparatus for concentration, in accordance with claim 4, wherein the discharge level of the gas-pulp mixer into the froth separating tank is arranged under the surface of froth in the froth separating tank.

8. An apparatus for concentration, in accordance with claim 4, wherein the gas-pulp mixer has a body with the shape of a parallelepiped with an inclined bottom.

9. An apparatus for concentration, in accordance with claim 4, wherein the gas-pulp mixer has a body cylindrical in shape and has a conical bottom.

10. An apparatus for concentration, in accordance with claim 4, wherein the froth separating tank has a parallelepiped shape with an inclined bottom.

11. An apparatus for concentration, in accordance with claim 4, wherein the froth separating tank is cylindrical in shape with a bottom having the shape of an inverted cone.

12. An apparatus for concentration, in accordance with claim 4, wherein the upper end of the froth separating tank has pipes with injectors spaced at regular intervals through which wash water is added to the froth.

* * * * *